United States Patent
Wycech

(10) Patent No.: US 7,820,002 B2
(45) Date of Patent: Oct. 26, 2010

(54) METHOD FOR MAKING A RECEPTION ASSEMBLY AND AN RECEPTION ASSEMBLY

(76) Inventor: Joseph S. Wycech, P.O. Box 172, St. Clair Shores, MI (US) 48080

( * ) Notice: Subject to any disclaimer, the term of this patent is extended or adjusted under 35 U.S.C. 154(b) by 685 days.

(21) Appl. No.: 11/600,473

(22) Filed: Nov. 16, 2006

(65) Prior Publication Data

US 2008/0174036 A1   Jul. 24, 2008

(51) Int. Cl.
B29C 59/02   (2006.01)
B29C 65/52   (2006.01)

(52) U.S. Cl. .................. 156/182; 156/196; 156/278; 156/288; 206/453

(58) Field of Classification Search .......... 156/493, 156/217, 182, 196, 275.5, 278, 288, 583.1; 264/297.8; 425/515; 206/523, 524, 453
See application file for complete search history.

(56) References Cited

U.S. PATENT DOCUMENTS

| | | | |
|---|---|---|---|
| 2,382,004 A * | 8/1945 | Curran | 156/224 |
| 3,695,421 A * | 10/1972 | Wood | 206/523 |
| 4,107,426 A * | 8/1978 | Gordon | 536/56 |
| 4,559,984 A | 12/1985 | Wycech | |
| 4,610,836 A | 9/1986 | Wycech | |
| 4,695,343 A | 9/1987 | Wycech | |
| 4,732,806 A | 3/1988 | Wycech | |
| 4,737,407 A | 4/1988 | Wycech | |
| 4,751,249 A | 6/1988 | Wycech | |
| 4,769,391 A | 9/1988 | Wycech | |
| 4,828,115 A * | 5/1989 | Wiegand et al. | 206/576 |
| 4,836,516 A | 6/1989 | Wycech | |
| 4,853,270 A | 8/1989 | Wycech | |
| 4,861,097 A | 8/1989 | Wycech | |
| 4,883,179 A * | 11/1989 | Dionne | 206/523 |
| 4,901,500 A | 2/1990 | Wycech | |
| 4,908,930 A | 3/1990 | Wycech | |
| 4,911,734 A * | 3/1990 | Short | 8/471 |
| 4,922,596 A | 5/1990 | Wycech | |
| 4,923,902 A | 5/1990 | Wycech | |
| 4,933,187 A * | 6/1990 | Schneider | 424/497 |
| 4,964,514 A | 10/1990 | Wycech | |
| 4,978,562 A | 12/1990 | Wycech | |
| 4,995,545 A | 2/1991 | Wycech | |
| 5,124,186 A | 6/1992 | Wycech | |
| 5,308,663 A * | 5/1994 | Nakagawa et al. | 428/34.2 |
| 5,555,671 A * | 9/1996 | Voight et al. | 43/57.1 |
| 5,575,526 A | 11/1996 | Wycech | |
| 5,755,486 A | 5/1998 | Wycech | |
| 5,884,960 A | 3/1999 | Wycech | |
| 5,888,600 A | 3/1999 | Wycech | |
| 5,992,923 A | 11/1999 | Wycech | |
| 6,003,274 A | 12/1999 | Wycech | |
| 6,058,673 A | 5/2000 | Wycech | |
| 6,068,424 A | 5/2000 | Wycech | |
| 6,079,180 A | 6/2000 | Wycech | |
| 6,092,864 A | 7/2000 | Wycech | |
| 6,096,403 A | 8/2000 | Wycech | |
| 6,149,227 A | 11/2000 | Wycech | |
| 6,165,588 A | 12/2000 | Wycech | |
| 6,168,226 B1 | 1/2001 | Wycech | |

(Continued)

*Primary Examiner*—Richard Crispino
*Assistant Examiner*—Martin Rogers

(57) ABSTRACT

A methodology 10 which produces a reception assembly 101 which is biodegradable and which is adapted to selectively receive and support an item, such as a vehicular hood.

4 Claims, 6 Drawing Sheets

U.S. PATENT DOCUMENTS

| | | |
|---|---|---|
| 6,189,953 B1 | 2/2001 | Wycech |
| 6,237,304 B1 | 5/2001 | Wycech |
| 6,270,600 B1 | 8/2001 | Wycech |
| 6,272,809 B1 | 8/2001 | Wycech |
| 6,276,105 B1 | 8/2001 | Wycech |
| 6,287,666 B1 | 9/2001 | Wycech |
| 6,332,731 B1 | 12/2001 | Wycech |
| 6,341,467 B1 | 1/2002 | Wycech |
| 6,372,334 B1 | 4/2002 | Wycech |
| 6,378,831 B1 * | 4/2002 | Copeland, Jr. ........... 248/345.1 |
| 6,406,078 B1 | 6/2002 | Wycech |
| 6,455,126 B1 | 9/2002 | Wycech |
| 6,455,144 B1 | 9/2002 | Wycech |
| 6,482,496 B1 | 11/2002 | Wycech |
| 6,546,693 B2 | 4/2003 | Wycech |
| 6,551,475 B2 * | 4/2003 | Dwyer et al. ................ 204/281 |
| 6,587,742 B2 * | 7/2003 | Manuel et al. ................. 700/98 |
| 6,863,957 B2 | 3/2005 | Wycech |
| 6,865,811 B2 | 3/2005 | Wycech |
| 7,175,230 B2 | 2/2007 | Wycech |
| 7,211,321 B2 | 5/2007 | Wycech |
| 7,261,204 B2 | 8/2007 | Wycech |
| 7,300,616 B2 | 11/2007 | Wycech |
| 2002/0069635 A1 * | 6/2002 | Tsukamoto ................... 57/200 |
| 2002/0185769 A1 * | 12/2002 | Hasegawa et al. ............. 264/51 |
| 2003/0107145 A1 * | 6/2003 | Ozasa et al. ................ 264/46.9 |
| 2003/0236371 A1 * | 12/2003 | Wilson et al. ............... 526/266 |
| 2004/0040245 A1 * | 3/2004 | Sinclair et al. ................ 52/605 |
| 2004/0098921 A1 * | 5/2004 | Ward ........................... 49/502 |

* cited by examiner

METHOD FOR MAKING A RECEPTION ASSEMBLY AND AN RECEPTION ASSEMBLY

GENERAL BACKGROUND

1. Field of the Invention

The present invention generally relates to a method for making a reception assembly and to a reception assembly and, more particularly, to a method for making or forming, in one non-limiting embodiment, a three dimensional pocket reception assembly which is adapted to be bio-degradable, easily formed, and structurally sound and to such a three dimensional pocket assembly which is formed by this process.

2. Background of the Invention

Items, such a vehicular hood, are typically transported in styrofoam type or based containers in order to reduce the likelihood of damage to the items during transportation and to provide a secure reception/transportation structure.

While such styrofoam containers (e.g., reception assemblies) do structurally support and protect such items, they have become relatively costly and are environmentally undesirable since they do not quickly degrade once discarded (e.g., they remain within a landfill for a very long time). Moreover, these styrofoam type or based containers emit carcinogenic and other types of harmful fumes when burned, thereby representing a safety hazard and are typically formed by a method which requires the use of hazardous materials.

There is therefore a need for a new and improved container/reception assembly which overcomes some or all of the disadvantages of prior containers and reception assemblies and for a new and improved method for creating and forming such a new and improved container and reception assembly.

SUMMARY OF THE INVENTION

It is first non-limiting object of the invention to provide a reception assembly which overcomes some or all of the previously delineated drawbacks associated with current reception assemblies.

It is a second non-limiting object of the present invention to provide a method for forming a reception assembly which overcome some or all of the previously delineated drawbacks associated with current reception assembly forming methods.

It is a third non-limiting object of the present invention to provide a method for forming a reception assembly which utilizes only readily biodegradable materials and which produces a reception assembly which is readily biodegradable but which supports and protects items such as vehicular hoods.

According to a first non-limiting aspect of the present invention, a method for making a reception assembly is provided and includes the steps of creating a first portion; creating a second portion; spraying at least a portion of the first portion with a certain material; placing the first and second portions on a surface while abutting the first portion to the second portion; obtaining a male tool; heating the male tool while pressing the male tool onto the first and the second portions, thereby forming a pocket within the previously sprayed portion of the first portion; releasing the first and second portions from the tool; folding the first portion with respect to the second portion, thereby forming the reception assembly.

According to a second non-limiting aspect of the present invention, a method for forming a reception assembly is provided and includes the steps of creating a first portion; creating a second portion; placing reinforcement material upon the first portion; placing a certain second material upon the first portion; placing the first and second portions on a surface while abutting the first portion to the second portion; obtaining a male tool; heating the male tool while pressing the male tool onto the first and the second portions, thereby forming a pocket within the portion of the first portion which received the second material; releasing the first and second portions from the tool; folding the first portion with respect to the second portion, thereby forming the reception assembly According to a third non-limiting aspect of the present invention, a reception assembly is provided and includes a first portion which is formed from a biodegradable cellulosic material; a second portion which is formed from a biodegradable cellulosic material and which is joined to the first portion by a heat forming seam and which includes a heat formed pocket.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
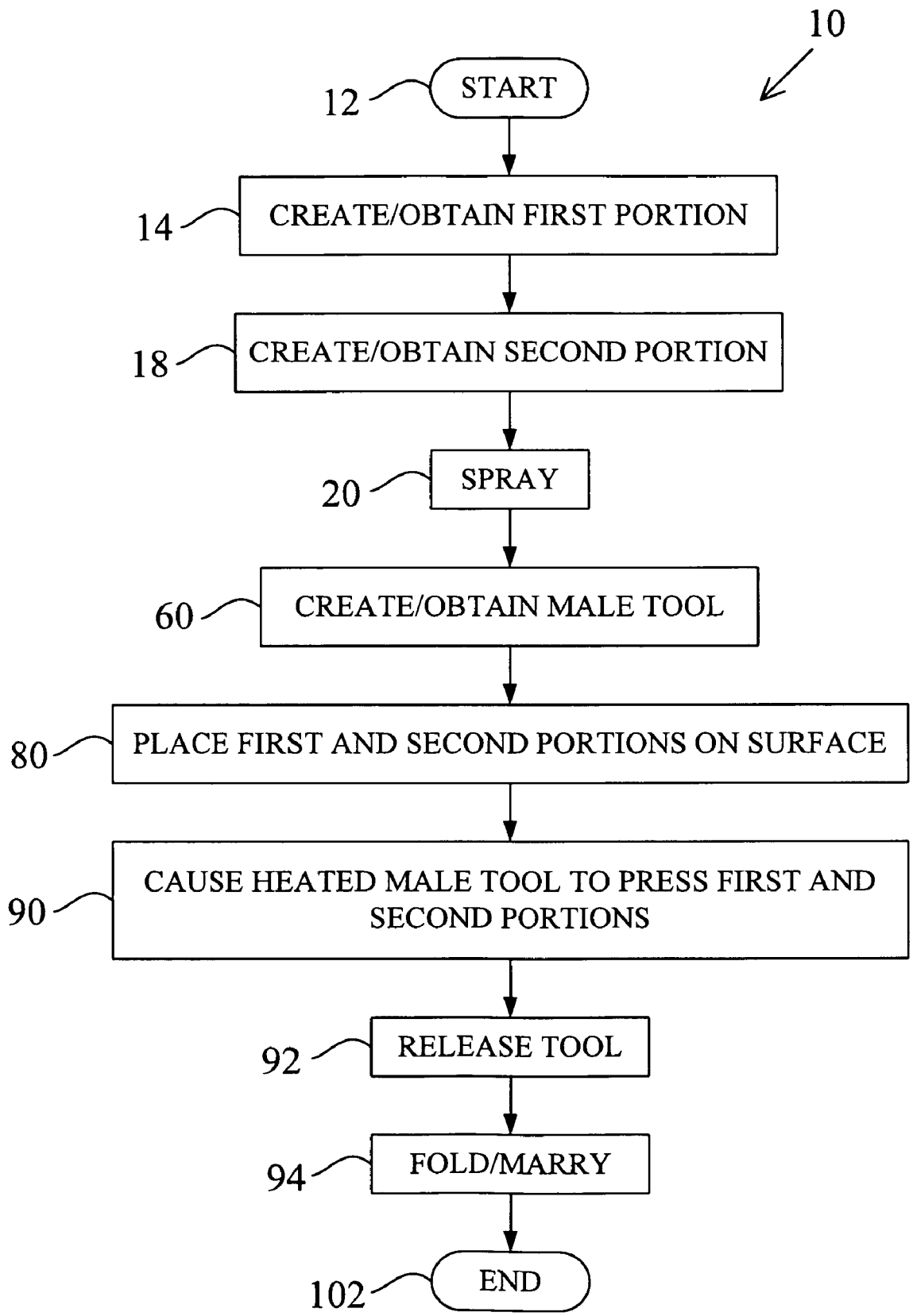
FIG. 1 is a flow chart which includes the various steps of the preferred reception assembly formation method of the present inventions.

Referring now to FIG. 1, there is shown a flowchart which comprises a sequence of steps which cooperatively form the methodology of the preferred embodiment of the invention.

Particularly, the methodology 10 begins with an initial step 12 in which it is determined that a new reception/container member or assembly needs to be selectively formed. It should be appreciated that, in this description, the terms "reception" and "container" each refer to a member or assembly which is adapted to receive and support an item, such as by way of example and without limitation, a vehicular hood. Hence, these two terms may be used interchangeably and therefore the terms "container assembly" and "reception assembly" mean the same thing for purposes of this description. That is, the terms "a reception assembly" and "a container assembly" each mean one or more members which are used to receive, protect, and transport an item, such as a vehicular hood.

Step 12 is followed by step 14 in which a first portion or member is obtained or created. By way of example and without limitation, this first portion or member is bio-degradable (e.g., readily "breaks down" or degrades when placed out of doors in a natural environment) and may comprise corn based cellulosic material or "greencell". Other types of cellulose based or bio-degradable material may be used to make the first portion.

It should be appreciated that the shape, size and overall geometric characteristics of this first portion or member may vary and that nothing in this description is meant to limit this first portion or member to any particular shape, size or geometric orientation. For example, as is perhaps shown best in FIG. 3, a first portion 15 may have a generally rectangular shape and may have a certain desired thickness 17.

Step 14 is followed by step 18 in which a second member or portion is obtained or created. In one non-limiting embodiment of the invention, the second portion is substantially similar in shape, size, overall geometric orientation and material constituency to the first portion. However, in other non-limiting embodiments of the invention, this second portion may have a different shape, size, and overall geometric orientation to that of the first portion and the second portion may be created from a different biodegradable material than the first portion.

Figure 3:
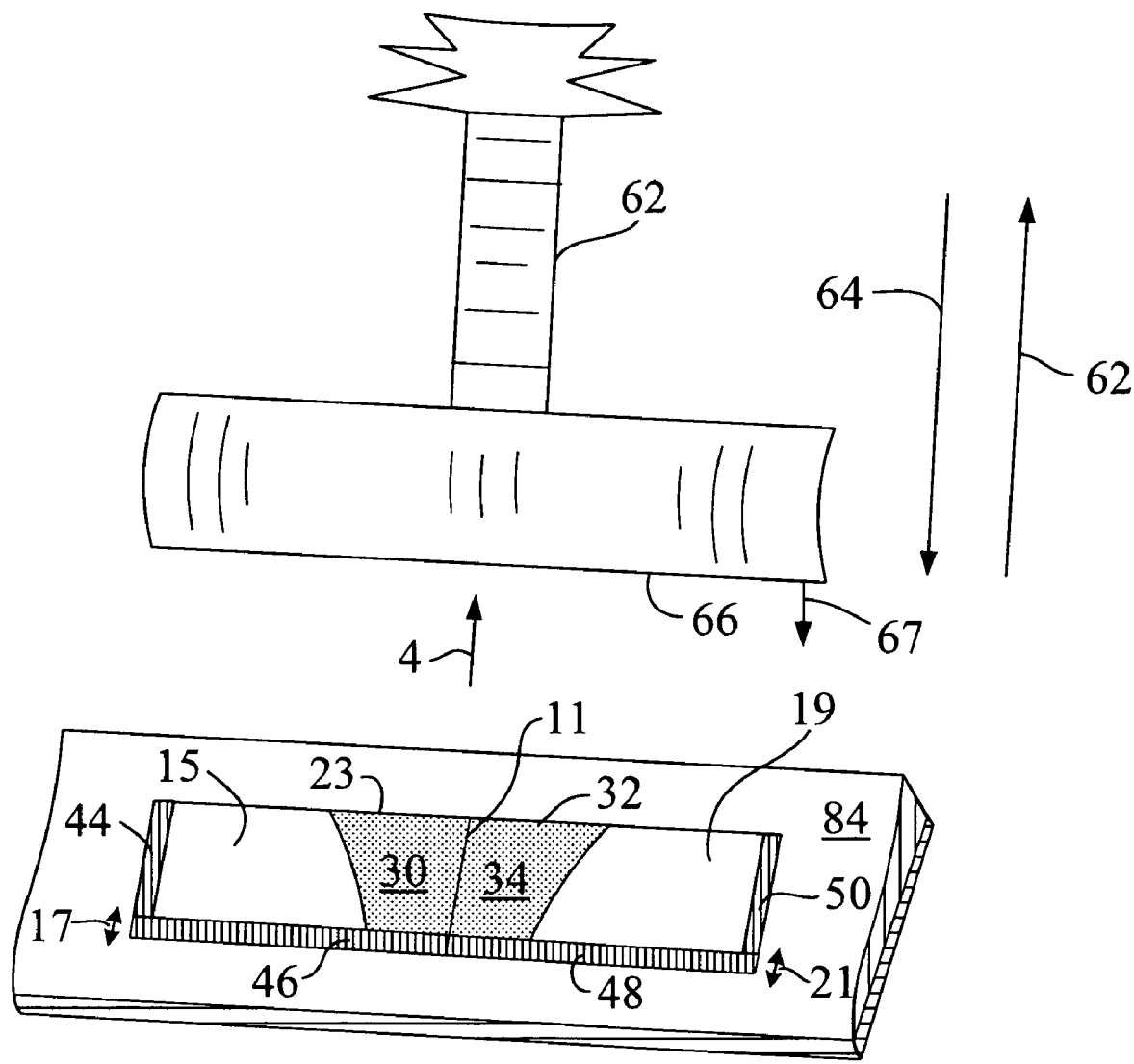
FIG. 3 is a partial perspective view of a tool which is made according to the teachings of the preferred embodiment of the invention in combination with two biodegradable members.

By way of example and without limitation, as shown best in FIG. 3, this second portion 19 may also have a generally rectangular shape and size and may also have a certain desired thickness 21.

Step 20 is followed by step 18 and, in this step 20, in one non-limiting embodiment of the invention, a surface area of first portion 15 within which a pocket is to be formed, such as surface area 23, selectively receives a certain material 30. Similarly, a surface area 32 of the second portion 19 within which a pocket is to be formed, such as surface area 32, selectively receives a certain second material 34. Further, the surface areas of the first portion 15 which are to selectively mate with surface areas of the second portion 19, such as surface areas 44, 46 also receive this first material 30. Similarly, the surface areas of the second portion 19 which are to selectively mate with the surface areas of the first portion 15, such as surface areas 48, 50, also receive this second material 34. In one non-limiting embodiment of the invention, the first material 30 is substantially similar to the second material 34 and each material comprises either water or a combination of white glue and water. Other types of material may be utilized. It should be appreciated that first and second materials 30, 34 may not be needed in all embodiments.

Figure 4:
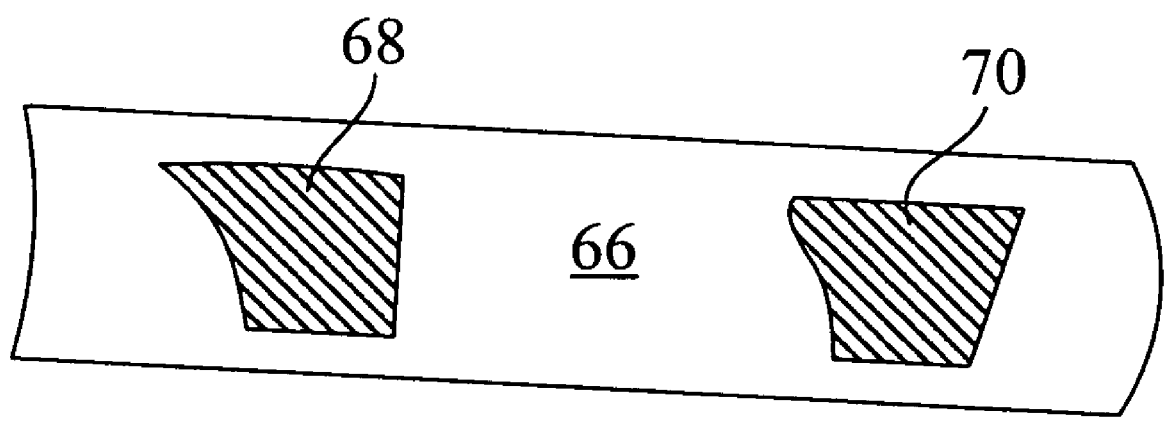
FIG. 4 is a view of the tool which is shown in FIG. 3 in the direction of view arrow 4.

Step 60 follows step 20 and, in this step 60, a male tool such as male tool 62 is created and/or obtained. Particularly, the tool 60 is adapted to be selectively and reciprocally movable along the directions 62, 64 (e.g., by means of a hydraulic or some other sort of actuation assembly (not sown)) and includes a bottom "portion contacting surface" 66 (see, for example, FIG. 4) which includes, in one non-limiting embodiment of the invention, male protrusions 68, 70 which each protrude away from surface 66 in the direction 67.

In this non-limiting embodiment, male protrusion 68 is substantially similar in size and shape to surface area 23 while male protrusion 70 is similar in size and shape to surface area 32. Particularly, it should be realized that each "treated surfaces" (e.g., the respective pocket forming surfaces 23, 32 of the first and second portions 15, 19 which respectively receive material 30, 34) has a unique male protrusion portion, such as portions 68, 70, associated with it and that the uniquely associated male protrusion portion must be the same size and shape as the surface portion to which it is uniquely associated.

Step 60 is followed by step 80 in which the first and second portions 15, 19 are placed upon a general flat platen or surface 84 which is positioned below the selectively and reciprocally moving tool 62. In one non-limiting embodiment, portions 15, 19 abut along edge 11. Particularly, pocket forming and treated surfaces, such as treated surfaces 23, 32 are made to communicate with the bottom surface 66 of the tool 62 (i.e., made to be selectively and respectively engaged by unique portions of the bottom surface 66).

Figure 5:
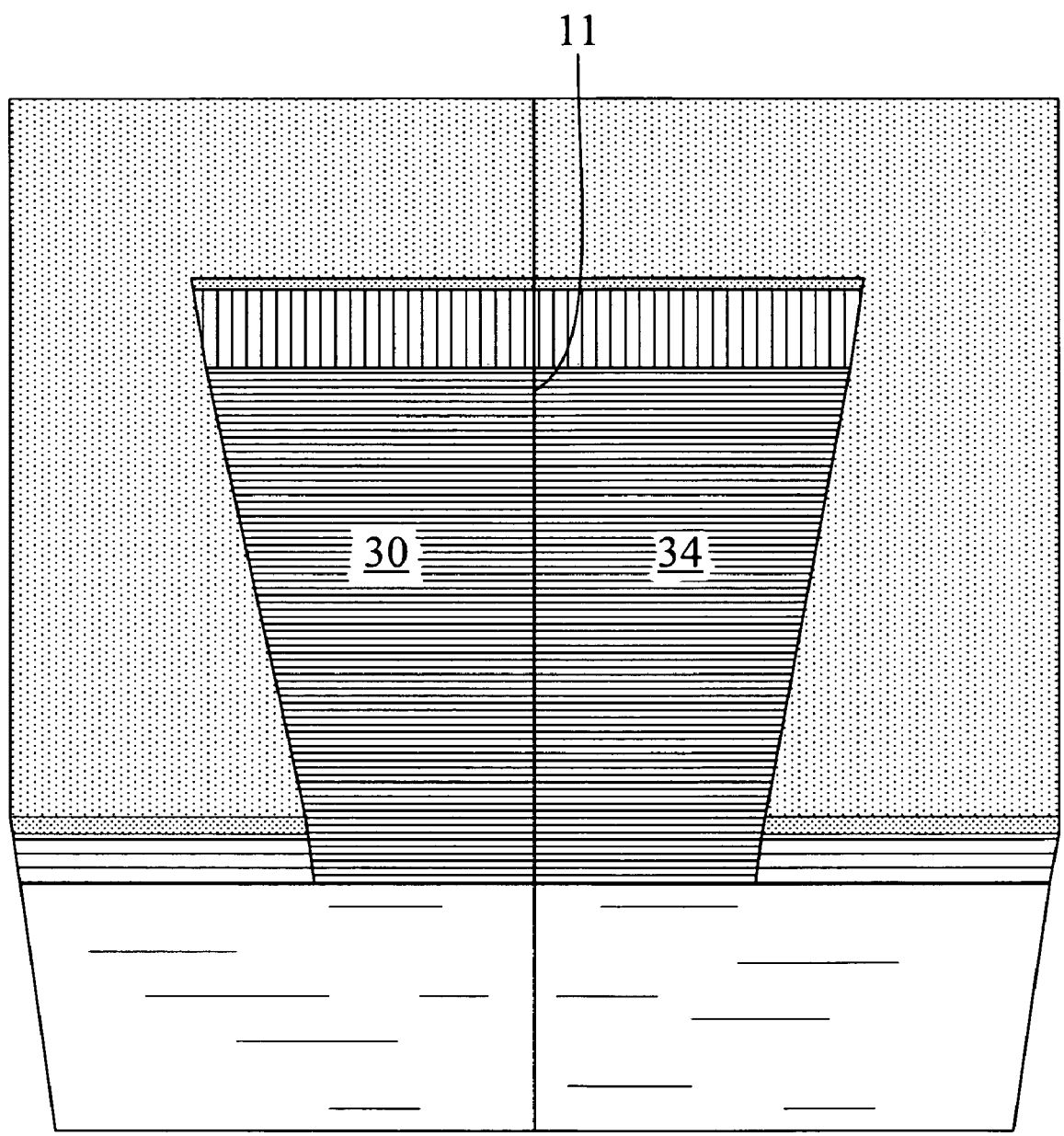
FIG. 5 is an exploded view of the cellulosic material which is shown in FIG. 3.

Step 90 follows step 80 and, in this step 90, the surface 66 is heated and then the tool 62 is moved in direction 64 such that the heated surface 66 is made to engage the first and second portions 15, 19 such that male protrusion portion 68 is aligned with and engages and penetrates the treated surface portion 30 and such that the male protrusion portion 70 is aligned with and engages and penetrates the treated surface portion 34. Particularly, the previously deposited materials 30, 34 and the heat, aid the tool 62 in creating these pockets. In this manner, portion 68 forms a pocket within surface portion 30 and portion 70 forms a pocket within surface portion 34 (see, for example, FIG. 5). In the event that more pockets are to be formed in a portion, such as portion 15, each male protrusion member is aligned with the treated surface to which it is uniquely associated and then each male protrusion member is made to respectively engage their respective and uniquely associated treated surfaces, thereby allowing the various male protrusion portions to cooperatively form pockets in each such treated surface of the portion.

Figure 2:
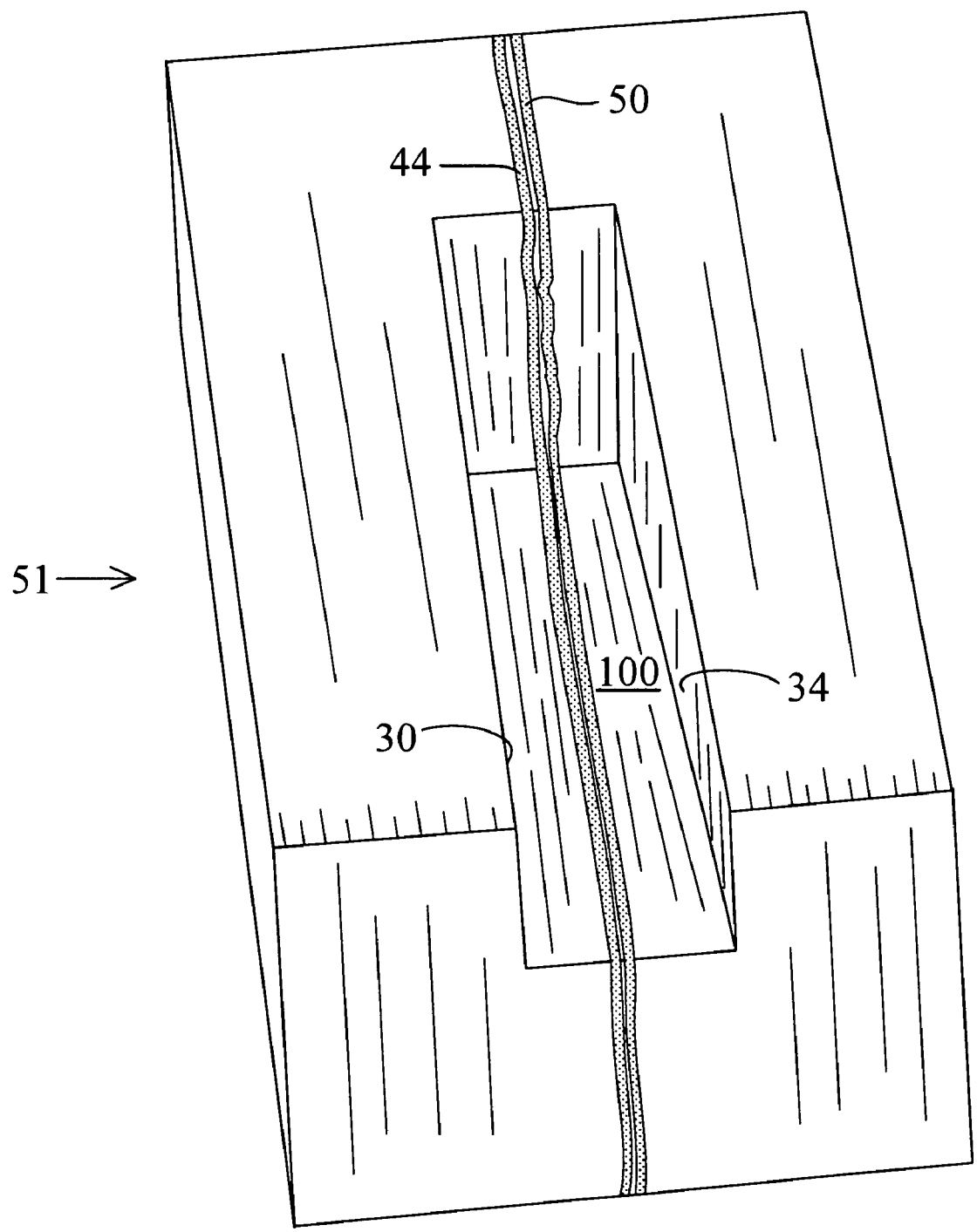
FIG. 2 is a perspective view of a reception assembly which is made in accordance with the teachings of one non-limiting embodiment of the inventions.

Step 92 follows step 90 and, in this step 92, the tool 62 is moved in the direction 62 away from the platen 84 and step 94 follows step 92 and, in this step 94, the first and second portions 15, 19 are folded and "married" in the manner shown in FIG. 2. That is, surface 44 is made to engage surface 50, surface 46 is made to engage surface 48 and the formed pockets in surface areas 30, 34 are made to communicated and to cooperatively form a reception area 100. Particularly, the combination of the previously deployed materials 30, 34 and the heat from the tool 62 allows the married surfaces 46, 48 to "stick" or "join together" and further allows the married surfaces 44, 50 to similarly "stick" or "join together". Additional glue/other material may be added between the engaged surfaces 44, 50 and 46, 48 to further secure the coupling of portion 15 to portion 19. Step 102 follows step 94 in which the created reception assembly 101 may be trimmed or "sized" appropriately or simply utilized as constructed.

In an alternate embodiment of the invention, reinforcing material in the form of tissue paper, cloth, and/or corrugated dust may be applied on the portions 15, 19 before the heated tool 62 engages the portions 15, 19 in order to structurally strengthen the reception assembly 101. The pressure and the heat from the tool 62 cause the deposited reinforcing material to adhere to the surfaces of portions 15, 19.

Figure 6:
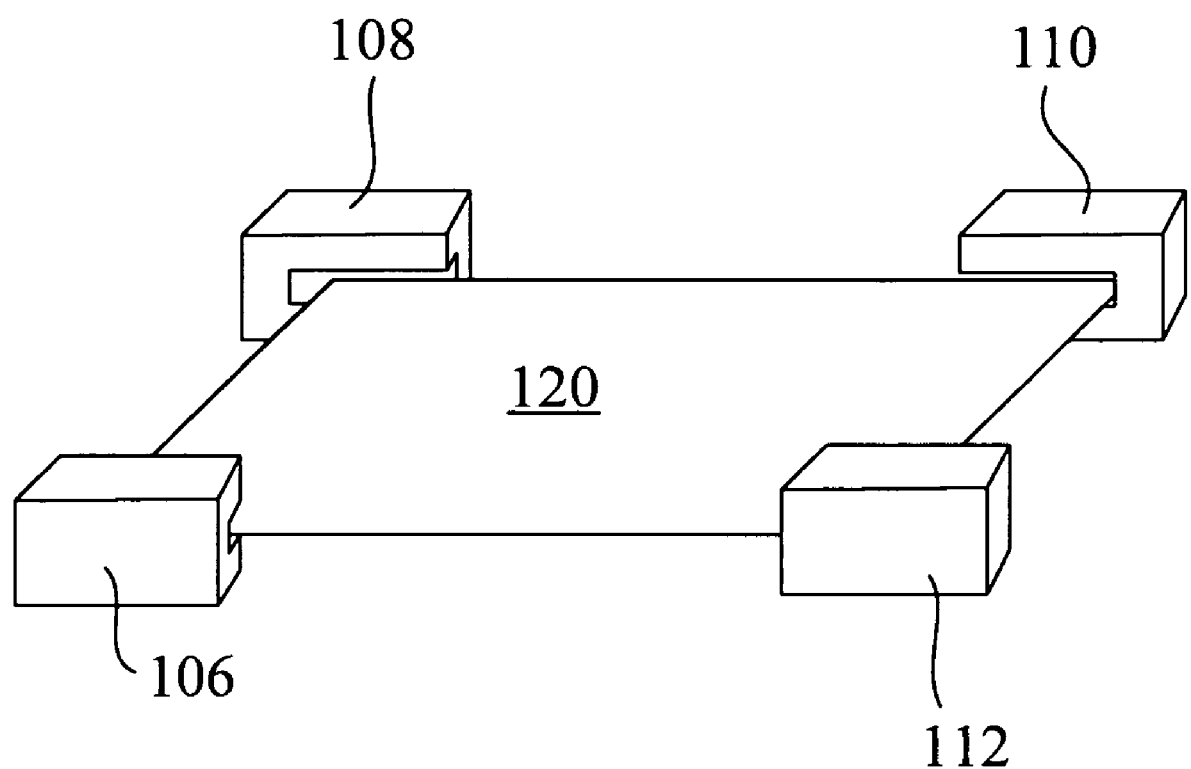
FIG. 6 is a perspective view of several reception assemblies being used to cooperatively transport/protect an item.

As shown best in FIG. 6, reception members 106, 108, 110, 112 may cooperatively receive and secure a vehicle or hood 120, or other item, for transportation and then be easily and "cleanly" disposed of after use and that such members 106-112 cooperatively form a "reception assembly" In other scenarios, only one such member may be needed to protect/secure/transport and item and this one such member may solely represent an "assembly".

It is to be understood that the inventions are not limited to the exact construction or methodology which has been delineated above, but that various changes and modifications may be made without departing from the spirit and the scope of the inventions as are more fully delineated in the following claims. Thus, from the foregoing, it should be appreciated that process/methodology 10 provides the creation of reception members/assemblies which are bio-degradable and by use of process which is both cost effective and which does not use harmful chemicals/substances. Further, the tool 62 may comprise a sectional tool such as that which is described within U.S. Pat. No. 6,587,742 B2, which is fully and completely incorporated herein by reference, word for word and paragraph for paragraph.

What is claimed is:

1. A method for making a reception assembly comprising the steps of obtaining a first biodegradable portion; obtaining a second biodegradable portion; selecting a certain first surface portion of said first biodegradable portion in which to form a first pocket; selecting a second surface portion of said second biodegradable portion in which to form a second pocket; placing a first material upon said first and second surface portions; placing said first and said second portions on a surface while causing said first and said second portions to only abut at respective third and fourth surfaces; placing a reinforcement material upon said previously deposited first material; placing said first material along a first face of said first biodegradable portion; placing said first material along a first face of said second biodegradable portion; obtaining a male tool; simultaneously heating said male tool and pressing said heated male tool onto each of said first and second surface portions, thereby simultaneously forming pockets within said first and second surface portions while simultaneously causing said reinforced material to adhere within said pockets and simultaneously heating said first material respectively residing on said first face; retracting said male tool; contacting said first face of said first biodegradable portion to said first face of said second biodegradable portion, thereby, causing said respective first faces to be coupled by the coupling of said respective heated material residing on said respective first faces; and causing said formed reinforced pockets to communicate when said respective first faces are coupled, thereby, causing said respective reinforced pockets to cooperatively form a single pocket and thereby forming a reception assembly.

2. A method for making a reception assembly comprising the steps of obtaining a first biodegradable portion; obtaining a second biodegradable portion; selecting a certain first surface portion of said first biodegradable portion in which to form a first pocket; selecting a second surface portion of said second biodegradable portion in which to form a second pocket; placing a first material onto at least said first and second surface portions; placing said first and said second portions on a surface while causing said first and said second portions to only abut at respective third and fourth surfaces; placing a reinforcement material only upon said previously deposited first material; placing said first material along a first face of said first biodegradable portion; placing said first material along a first face of said second biodegradable portion; obtaining a male tool; simultaneously heating said male tool and pressing said heated male tool onto each of said first and second surface portions, thereby simultaneously forming pockets within said first and second surface portions while simultaneously causing said reinforced material to adhere within said pockets and simultaneously heating said first material respectively residing on said first face; retracting said male tool; contacting said first face of said first biodegradable portion to said first face of said second biodegradable portion, thereby, causing said respective first faces to be coupled by the coupling of said respective heated material residing on said respective first faces; and causing said formed reinforced pockets to communicate when said respective first faces are coupled, thereby, causing said respective reinforced pockets to cooperatively form a single pocket and thereby forming a reception assembly.

3. The method of claim 2, wherein a portion of a vehicle is placed within said reception assembly.

4. The method of claim 2, wherein a hood is placed within the reception assembly.

* * * * *